United States Patent [19]

Upton, Jr.

[11] 4,190,318
[45] Feb. 26, 1980

[54] OPTICAL SLIP RING APPARATUS UTILIZING RADIAL LIGHT SIGNALS

[75] Inventor: Robert W. Upton, Jr., Seminole, Fla.

[73] Assignee: Honeywell Inc., Minneapolis, Minn.

[21] Appl. No.: 870,908

[22] Filed: Jan. 19, 1978

[51] Int. Cl.² .................................................. G02B 5/16
[52] U.S. Cl. .................................. 350/96.20; 250/227
[58] Field of Search ............... 350/96.20, 96.15, 96.24, 350/96.14; 250/227

[56] References Cited

U.S. PATENT DOCUMENTS

| | | | |
|---|---|---|---|
| 2,993,999 | 7/1961 | Kay | 350/219 |
| 3,411,011 | 11/1968 | Genahe et al. | 350/96.20 |
| 3,731,107 | 5/1973 | Goodwin et al. | 250/227 |
| 3,876,998 | 4/1975 | Richter et al. | 340/189 M |
| 3,934,246 | 1/1976 | Mueller | 350/96.20 |
| 4,023,887 | 5/1977 | Speers | 350/96.14 |
| 4,027,945 | 6/1977 | Iverson | 350/96.20 |
| 4,088,387 | 5/1978 | Lewis | 350/96.20 |
| 4,107,517 | 8/1978 | Cooper | 350/96.20 |

OTHER PUBLICATIONS

DiDomenico, Jr., "Wires of Glass", *Industrial Research*, pp. 50-54, Aug. 1974.
Grimes et al., "Fiber Optics Slip Rings for Rotating Test Fixture Data Acquisitions", ISBN 87664-362-4 ISA, pp. 1-9, (1977).
Spiro, "Modern Utilization of Infrared Technology II", SPIE, vol. 95, pp. 178-187, 1976.

*Primary Examiner*—Stewart J. Levy
*Attorney, Agent, or Firm*—Charles L. Rubow

[57] ABSTRACT

Optical slip ring apparatus is disclosed in which radial light signals formed in a continuous ring are transmitted between a barrel and a surrounding sleeve within which the barrel is rotatably mounted. The ring of light signals is produced and detected respectively by a plurality of light emitting diodes and light detector means carried on the barrel and the sleeve. The light detector means may include an optical fiber bundle for transmitting light signals to a remote detector. In one embodiment, a plurality of optical and electromechanical slip ring channels are incorporated into a single device.

20 Claims, 7 Drawing Figures

OPTICAL SLIP RING APPARATUS UTILIZING RADIAL LIGHT SIGNALS

BACKGROUND OF THE INVENTION

The present invention relates generally to apparatus for transmitting signals between two relatively rotatable members, and more specifically to slip ring apparatus wherein light signals formed in a continuous ring are transmitted without physical contact between the members. The invention offers particular advantages in apparatus having a substantial number of signal channels.

Requirements to transmit electrical power and data across rotary joints have existed for many years. Traditionally, such functions were accomplished with electromechanical sliding contact slip rings. Early slip ring applications, including those for data transmission, typically involved the transmission of appreciable amounts of power. Sliding contacts were well suited to transmission of signals characterized by significant voltages and/or currents.

As the technologies involving the use of slip ring apparatus progressed, the inherent characteristics of electromechanical slip rings began to impose increasingly severe limitations on system performance. More specifically, advancing technologies required increased channel capacity combined with overall size reduction, decreased cross-coupling of signals on separate channels and decreased noise, dead band and power consumption. However, increasing the number of sliding contacts resulted in higher friction levels which increased power consumption and/or resulted in higher dead bands. Attempts to reduce friction levels by reducing contact pressure increased the susceptibility of sliding contacts to lift during vibration, thereby introducing noise and/or signal interruptions. In addition, the lower power levels of contemporary data signals were accompanied by reduced immunity to contamination, and by consequent increased likelihood of signal interruption and/or distortion.

More recently, devices utilizing light signals have been developed to overcome some of the foregoing problems. In general, such devices comprise a pair of members, one of which is rotatable with respect to the other about an axis of rotation. One of the members carries a light detector which is aligned with a light source carried by the other member. Accordingly, light signals, which may be modulated to convey data or information of interest, are transmitted across the moving/stationary interface without physical contact between relatively moving members. Typical known forms of such devices are disclosed in U.S. Pat. Nos. 3,401,232, 3,922,063 and 4,027,945 issued respectively to J. S. Goldhammer et al on Sept. 10, 1968, F. A. Marrone on Nov. 25, 1975 and M. L. Iverson on June 7, 1977. Each disclosed device employs a light source and a detector aligned with the axis of rotation. Multiple channels may be provided by arranging light sources and detectors on the axis of rotation and in concentric rings about the axis.

Such arrangements are practical and satisfactory for small numbers of channels. However, for larger numbers of channels the required area perpendicular to the axis of rotation becomes prohibitively large since the area increases approximately as the square of the number of channels. Further, where the light source and/or detector are implemented by spreading the ends of light transmitting fibers of a fiber bundle into a ring as disclosed in U.S. Pat. No. 4,027,945, the number of fibers required to implement individual channels varies approximately as the square of the radius of the rings. For larger rings, a very large number of fibers becomes necessary, and it becomes increasingly difficult to evenly distribute the light signal around the ring. Uneven distribution generally results in modulation of the transmitted light as the one member rotates relative to the other member.

The applicant has avoided problems associated with differences in channel geometry (i.e., rings of different radii) and practical limitations on the number of channels in optical slip ring apparatus by devising a configuration in which a plurality of identical channels are axially spaced along the axis of rotation. Accordingly, each channel occupies the same amount of area and volume as any other channel. The number of channels is limited only by limitations on the length of the apparatus along the axis of rotation. Further, the channels may be configured very compactly so as to avoid any requirement for prohibitively large fiber bundles, and to minimize position dependent modulation of transmitted light signals.

SUMMARY OF THE INVENTION

The applicant's unique optical slip ring apparatus basically comprises first and second members, one of which is rotatable relative to the other about an axis of rotation, and one of which is adapted to carry a light source for emitting a radial light signal throughout a continuous ring in a plane perpendicular to the axis. The other member carries a light detector which is positioned to receive radial light signals emitted by the light source. The first and second members may comprise a barrel extending along the axis of rotation and a sleeve within which the barrel is rotatably carried. A multiple channel device may be implemented by arranging a plurality of identical light sources and corresponding light detectors along the axis of rotation. The optical channels may be implemented in a device which also includes one or more electromechanical channels, each electromechanical channel comprising a ring contact member and a brush or slider element in a plane spaced from the planes of the optical channels.

The primary object of this invention is to provide an optical slip ring configuration which is adaptable to a large number of signal channels.

It is a further object of this invention to provide optical slip ring apparatus of a unique design wherein data is transmitted by means of a radial light signal throughout a continuous ring.

A further object is to provide an optical slip ring configuration which is compact and consumes little power.

A further object is to provide optical slip ring apparatus which may be implemented with conventional low cost components.

Yet a further object is to provide slip ring apparatus which is well suited to include both optical and electromechanical channels.

Additional objects of the invention may be ascertained from a study of the disclosure, drawings and appended claims.

DESCRIPTION OF THE PREFERRED EMBODIMENT

Figure 1:
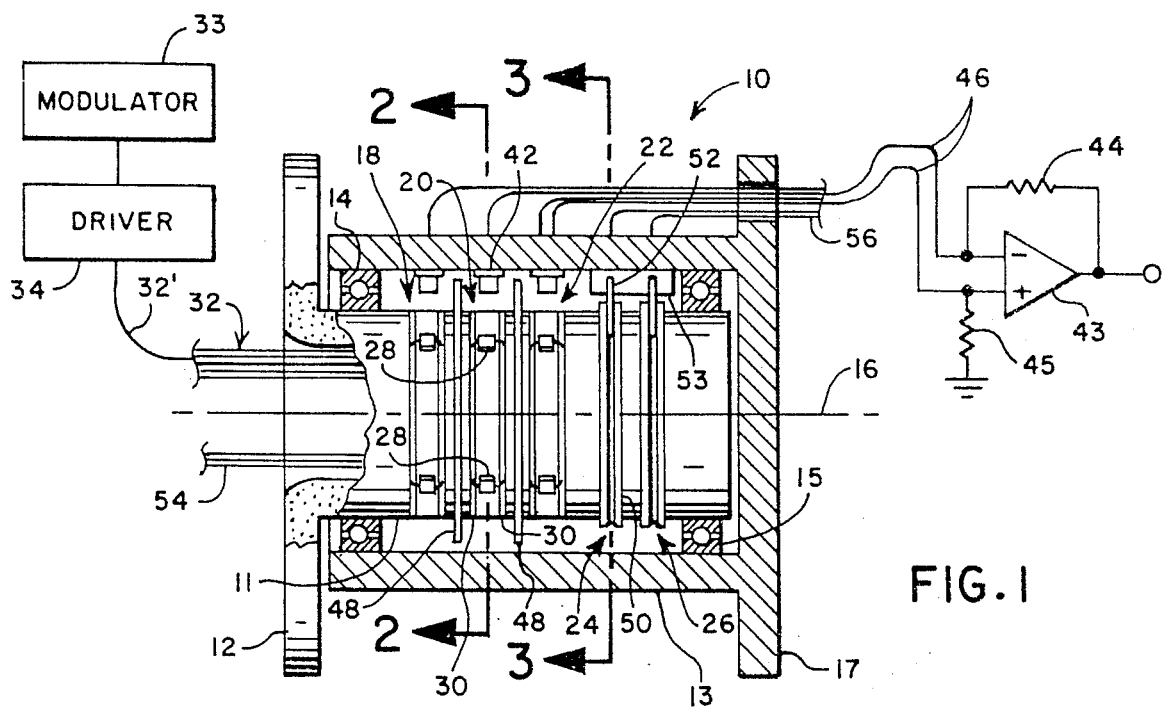
FIG. 1 is a longitudinal cross sectional view of multiple channel optical slip ring apparatus in accordance with the applicant's invention.
Figure 2:
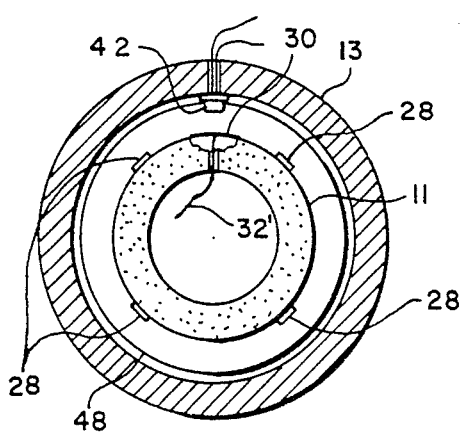
FIG. 2 is a cross sectional view of the optical slip ring apparatus of FIG. 1 taken along lines 2—2.
Figure 3:
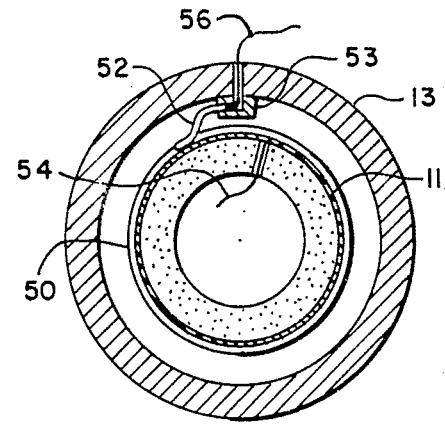
FIG. 3 is a cross sectional view of the optical slip ring apparatus of FIG. 1 taken along lines 3—3.

In FIG. 1, reference numeral 10 generally identifies multiple channel slip ring apparatus in accordance with the applicant's invention. Apparatus 10 comprises a first member 11 including a flange 12 to permit attachment to a first body which may comprise a portion of equipment in which it is necessary to transmit signals across a rotating/stationary interface. As shown in FIGS. 1–3, member 11 is configured as a barrel having a circular cross section.

Member 11 is carried in a member 13 by means of a pair of bearings 14 and 15, and is rotatable relative thereto about an axis of rotation 16. Member 13 includes a flange 17 to permit attachment to a second body which also comprises a portion of equipment in which transmission of signals across a rotating/stationary interface is required. As shown in FIGS. 1–3, member 13 is configured as a sleeve extending over barrel 11 along axis 16.

For illustrative purposes, slip ring apparatus 10 is shown with three optical channels 18, 20 and 22 and two electromechanical channels 24 and 26. As shown in FIGS. 1 and 2, each optical channel comprises a light source carried on barrel 11 and a light detector carried on sleeve 13. All optical channels are identical. Only channel 20 will be described in detail.

The light source for channel 20 is shown comprising a plurality of light emitting diodes 28 equally spaced around barrel 11 in a plane perpendicular to axis 16. The electrical leads of diodes 28 are connected to a pair of conducting paths 30. Barrel 11 may be formed of a ceramic material and paths 30 deposited thereon by conventional techniques. One of a plurality of conductors 32 extends from at least one path 30 in each pair of paths through the center of barrel 11 to electronic circuitry external to slip ring apparatus 10. As shown in FIG. 1, the electronic circuitry may comprise a conventional modulator 33 and driver 34 connected to one of paths 30 through a conductor 32'.

Diodes 28 emit a modulated light signal in radial directions. The applicant has discovered that four conventional light emitting diodes equally spaced around a small diameter circle emit a relatively uniform ring of radial light signals. The reasons underlying this performance can be understood by reference to FIGS. 6 and 7.

A number of factors effect the actual light output of a light emitting diode chip. However, the radiation pattern of a flat light emitting diode chip is theoretically closely approximated by Lambert's cosine law. Thus, a maximum output is observed when the diode is viewed from directly in front of the flat surface. The output drops to zero as the viewing angle is changed to view the diode from either edge.

Figure 6:
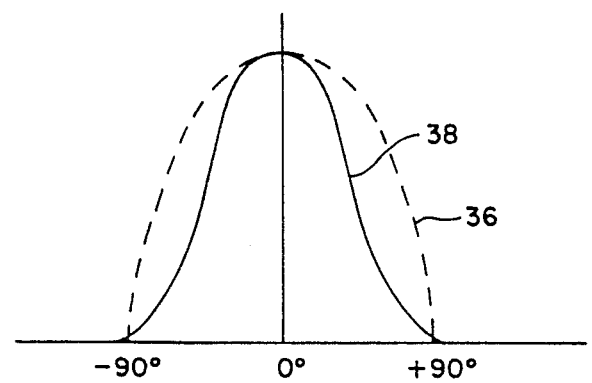
FIG. 6 illustrates the theoretical and actual distribution of light emitted by light sources suitable for use in the optical slip ring apparatus of FIG. 1.

If it is assumed that a light emitting diode chip is mounted on a small shaft which is rotatable about its longitudinal axis so that the diode moves in a small circle in a plane perpendicular to the axis and the light emitted in a given radial direction through a small aperture is detected, the theoretical light intensity is represented by curve 36 in FIG. 6. Experimentally, it has been found that the light intensity from a revolving diode chip detected by a photodetector is not truly Lambertian, but is represented by curve 38. This curve approximately follows the relationship Output=0.5output$_{max}$+0.5output$_{max}$ cos $2\theta$ where $\theta$ is the viewing angle with reference to a point directly in front of the diode.

Figure 7:
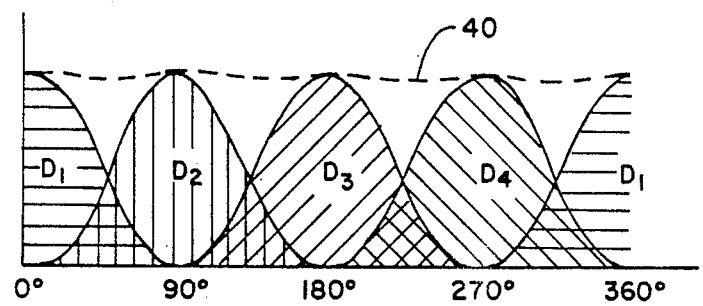
FIG. 7 illustrates the composite radial light output of four light sources of the type to which FIG. 6 pertains when the devices are spaced around a circle.

If four identical diodes spaced 90° apart around a small rotating shaft are energized in parallel and viewed from a single point, the composite output may be considered as the sum of two periodic waveforms as illustrated in FIG. 7. The light received from the individual diodes is represented by the areas labelled $D_1$, $D_2$, $D_3$ and $D_4$. The composite output is represented by dashed line 40. As can be observed, the composite output is nearly constant, with little rotation or position dependent modulation. Although there are significant practical limitations in the manufacturing, assembly and alignment of components, it has been found that four diodes properly placed around a shaft can provide a nearly constant output as the shaft rotates.

In the slip ring apparatus of FIGS. 1–3, the light emitted by diodes 28 is detected by a photodetector 42. The signal produced by detector 42 is supplied to output electronic circuitry comprising an operational amplifier 43 having a feedback resistor 44 connected between its output and inverting input terminals. The noninverting input terminal of amplifier 43 is connected to a reference potential source or ground through a resistor 45. Electrical connections between the diode and output circuitry are accomplished through conductors 46 which are shown routed along an external surface of sleeve 13.

With optical slip ring apparatus 10 configured as previously described and implemented with conventional components, it is possible that there may be objectionable cross coupling of optical signals in adjacent channels. Such cross coupling results from detection in one channel of light signals emitted in an adjacent channel. This cross coupling can be minimized by reducing the aperture of the detectors, such as by masking the faces thereof to reduce the window size. Another method, and one that is illustrated in FIGS. 1 and 2, involves providing opaque baffles between adjacent channels. As shown, each baffle comprises an annular disk member or washer 48 fixed to barrel 11 and projecting outwardly therefrom nearly to the internal surface of sleeve 13. Such a baffle effectively separates adjacent channels and prevents light signals emitted by the diodes in one channel from reaching the detectors in adjacent channels.

Electromechanical slip ring channels 24 and 26 are of conventional design. The principal features of a typical electromechanical slip ring channel will be briefly described with reference to channel 24. Channel 24 comprises a conductive ring 50 carried on barrel 11 in a plane parallel with and spaced from the planes of the optical channels. Conductive ring 50 conventionally has an outer surface configured with an annular V-shaped groove therein in which a brush or slider element 52 rides. Slider element 52 is mounted in a block 53 which is carried on sleeve 13. The electrical signals on ring 50 and slider 52 are carried therefrom by means of leads 54 and 56 respectively.

Figure 4:
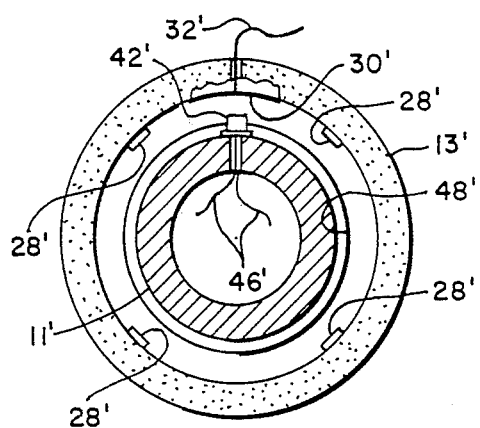
FIG. 4 is a cross sectional view of a first alternative embodiment of optical slip ring apparatus in accordance with the applicant's invention.

In the alternative embodiment illustrated in FIG. 4, the relative positions of the light source and detector are reversed from the embodiment shown in FIGS. 1 and 2. A plurality of light emitting diodes 28' are equally spaced around the interior of sleeve 13' in a plane perpendicular to the axis of rotation of the slip ring apparatus. Electrical signals are supplied to the light emitting diodes by means of conductive paths 30' on the interior surface of sleeve 13'. One of paths 30' is shown with an attached lead 32' for connection to external electronic circuitry.

A light detector 42' is carried on barrel 11', and produces electrical signals on leads 46' corresponding to the light signals received thereby. A baffle 48' is shown for minimizing cross coupling of light signals in adjacent channels. Baffle 48' is a disk shaped member or washer mounted on sleeve 13' and extending inwardly to a diameter just greater than the outer diameter of barrel 11'.

Optical slip ring channels as illustrated in FIGS. 1 and 2 are suitable for transmitting light signals from equipment on which the barrel is mounted to equipment on which the sleeve is mounted. Channels configured as shown in FIG. 4 are suitable for transmitting light signals in the opposite direction. Channels of both types may be incorporated into a single slip ring device as necessary for any specific application.

Figure 5:
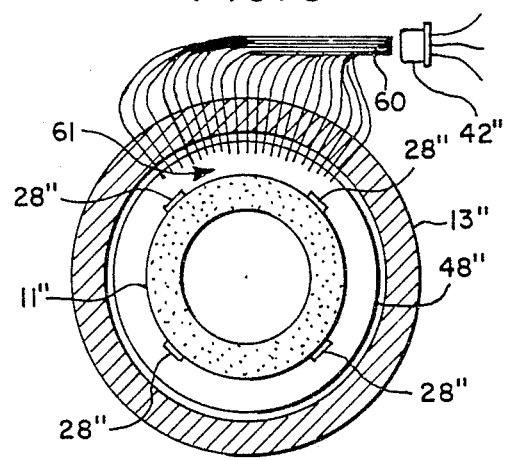
FIG. 5 is a cross sectional view of a second alternative embodiment of optical slip ring apparatus in accordance with the applicant's invention.

A second alternative embodiment of the applicant's optical slip ring apparatus is shown in FIG. 5 wherein the photodetector may be mounted remotely from the sleeve or barrel. Except for the optical signal detection portion of the apparatus, the embodiment of FIG. 5 is identical to that shown in FIGS. 1 and 2. It includes a barrel 11" rotatably mounted within a sleeve 13", and having a plurality of light emitting diodes 28" equally spaced therearound for emitting radial light signals in a continuous ring in a plane perpendicular to the axis of rotation. A baffle 48" mounted on barrel 11" is shown for minimizing cross coupling of optical signals in adjacent channels.

The light detector portion of the apparatus comprises a photodetector 42" and an optical fiber bundle 60. The optical fibers at one end of bundle 60 are shown separated and held by sleeve 13" in a planar array in the plane defined by diodes 28". Further, fiber ends 61 are arranged in an arc and radially directed toward the axis of rotation. The arc is sufficiently long that light from at least one diode is received by end 61 of one or more fibers for every position of barrel 11" relative to sleeve 13". The light signals received at ends 61 are transmitted through the fibers to detector 42". In such a configuration, it is not necessary to route electrical conductors along sleeve 13", or to have any electrical signals associated with the sleeve.

Yet a further equally satisfactory embodiment could be designed with the light source carried on the inner surface of the sleeve similar to the embodiment of FIG. 4, and a planar array of optical fibers similar to that of FIG. 5 carried by the barrel. Finally, corresponding planar arrays of optical fibers could be carried by both the barrel and the sleeve. Such an embodiment would offer the potential for bidirectional data transmission over every channel.

Several variations of optical slip ring apparatus in accordance with the applicant's invention have been shown and described for illustrative purposes. Other embodiments which do not depart from the teaching herein will be apparent to those skilled in the art. The applicant does not intend that coverage be limited to the disclosed variations, but only by the terms of the appended claims.

The embodiments of the invention in which an exclusive property or right is claimed are defined as follows:

1. Optical slip ring apparatus for transmitting light signals between two bodies, one of which is rotatable relative to the other about an axis of rotation, comprising:
   a first light source for emitting a first radial light signal throughout a continous ring in a first plane;
   a first member adapted to be fixed to one of the relatively rotatable bodies, and adapted to carry said first light source so that said ring is centered on the axis of rotation and the first plane is perpendicular to the axis of rotation;
   a first light detector; and
   a second member adapted to be fixed to the other of the relatively rotatable bodies, and adapted to carry said first light detector so that it is positioned to receive radial light signals emitted by said first light source.

2. The optical slip ring apparatus of claim 1 wherein:
   said first member comprises a barrel extending along the axis of rotation;
   said second member comprises a sleeve extending over said barrel along the axis of rotation; and
   said first light source and said first light detector are carried on surfaces of said barrel and said sleeve.

3. The optical slip ring apparatus of claim 2 further including:
   a second light source for emitting a second radial light signal throughout a continuous ring in a second plane parallel with and axially spaced from the first plane; and
   a second light detector positioned to receive radial light signals emitted by said second light source.

4. The optical slip ring apparatus of claim 3 further including baffle means for preventing cross coupling of light signals emitted by said first and second light sources.

5. The optical slip ring apparatus of claim 4 wherein said baffle means comprises an annular disk member interposed between said barrel and said sleeve, and lying in a third plane between the first and second planes.

6. The optical slip ring apparatus of claim 5 wherein:
   said first and second light sources each comprises a plurality of light emitting diodes spaced around the periphery of said barrel; and
   said first and second light detectors are carried on the interior of said sleeve and located in the first and second planes respectively.

7. The optical slip ring apparatus of claim 6 further including an electromechanical slip ring channel comprising:
a contact ring carried on said barrel in a fourth plane parallel with and spaced from the first, second and third planes;
a slider element carried within said sleeve and positioned to engage said contact ring; and
means for conducting electrical signals to said contact ring and said slider element.

8. The optical slip ring apparatus of claim 7 further including means for converting at least one of said first and second light signals into a corresponding electrical signal.

9. The optical slip ring apparatus of claim 2 wherein:
said first light source comprises a plurality of light emitting diodes spaced around the periphery of said barrel; and
said first light detector is carried on the interior of said sleeve and located in the first plane.

10. The optical slip ring apparatus of claim 9 wherein said plurality of light emitting diodes comprises four light emitting diodes equally spaced around said barrel.

11. The optical slip ring apparatus of claim 2 wherein:
said first light source comprises a plurality of light emitting diodes spaced around the interior of said sleeve; and
said first light detector is carried on said barrel and located in the first plane.

12. The optical slip ring apparatus of claim 2 wherein said first light detector includes optical fiber means having an end oriented to receive radial light signals emitted by said first light source.

13. Multiple channel optical slip ring apparatus for simultaneously transmitting a plurality of light signals between two relatively rotatable bodies comprising:
a barrel adapted to be connected to one of said bodies;
a sleeve adapted to be connected to the other of said bodies;
bearing means for carrying said barrel within said sleeve so as to permit relative rotation about an axis;
a plurality of light sources mounted on said barrel, each light source for emitting a radial light signal in a continuous ring in a separate plane perpendicular to the axis; and
a plurality of light detectors mounted within said sleeve, each light detector lying in a separate one of the planes of said plurality of light sources, and positioned to receive the radial light signal emitted by the light source in the plane.

14. The multiple channel optical slip ring apparatus of claim 13 wherein each light source comprises a plurality of light emitting diodes spaced around the periphery of said barrel.

15. The multiple channel optical slip ring apparatus of claim 14 wherein each light source comprises four light emitting diodes equally spaced around said barrel.

16. The multiple channel optical slip ring apparatus of claim 15 further including baffle means for preventing cross coupling of light signals emitted by adjacent light sources.

17. The multiple channel optical slip ring apparatus of claim 16 wherein said baffle means comprises an annular disk interposed between said barrel and said sleeve between each pair of adjacent light sources.

18. The multiple channel optical slip ring apparatus of claim 17 further including means for converting at least one of the light signals into a corresponding electrical signal.

19. The multiple channel optical slip ring apparatus of claim 18 further including an electromechanical slip ring channel comprising:
a contact ring carried on said barrel in a plane parallel with and spaced from the planes of said plurality of light sources;
a slider element carried on said sleeve and positioned to engage said contact ring; and
means for conducting electrical signals to said contact ring and said slider element.

20. The multiple channel slip ring apparatus of claim 14 wherein at least one of said plurality of light detectors includes optical fiber means having an end oriented to receive radial light signals emitted by the light source associated therewith.

* * * * *